(12) United States Patent
Nishimura et al.

(10) Patent No.: US 10,615,577 B2
(45) Date of Patent: Apr. 7, 2020

(54) METHOD FOR MANUFACTURING SPARK PLUG

(71) Applicant: NGK SPARK PLUG CO., LTD., Nagoya-shi, Aichi (JP)

(72) Inventors: Kota Nishimura, Nagoya (JP); Norihide Kachikawa, Nagoya (JP)

(73) Assignee: NGK SPARK PLUG CO., LTD., Nagoya-shi (JP)

( * ) Notice: Subject to any disclaimer, the term of this patent is extended or adjusted under 35 U.S.C. 154(b) by 0 days.

(21) Appl. No.: 16/504,697

(22) Filed: Jul. 8, 2019

(65) Prior Publication Data
US 2020/0021085 A1 Jan. 16, 2020

(30) Foreign Application Priority Data

Jul. 11, 2018 (JP) ................. 2018-131443
Mar. 13, 2019 (JP) ................. 2019-045321

(51) Int. Cl.
*H01T 21/02* (2006.01)
*G06T 7/00* (2017.01)
*H01T 13/58* (2020.01)

(52) U.S. Cl.
CPC .............. *H01T 21/02* (2013.01); *G06T 7/001* (2013.01); *H01T 13/58* (2013.01)

(58) Field of Classification Search
CPC .... H01T 21/00–06; H01T 13/58; G06T 7/001
See application file for complete search history.

(56) References Cited

U.S. PATENT DOCUMENTS

| 2002/0142696 | A1 | 10/2002 | Ito et al. |
| 2004/0029480 | A1* | 2/2004 | Fujita ...................... H01T 21/02 445/7 |
| 2019/0123517 | A1* | 4/2019 | Shimamura ............... G06T 7/13 |

FOREIGN PATENT DOCUMENTS

| CN | 103615987 A | * | 3/2014 |
| JP | 2002-313525 A | | 10/2002 |
| JP | 2004031069 A | * | 1/2004 |
| JP | 2007080638 A | * | 3/2007 |

\* cited by examiner

*Primary Examiner* — Mariceli Santiago
(74) *Attorney, Agent, or Firm* — Kusner & Jaffe

(57) ABSTRACT

A method for manufacturing a spark plug including a reference standard imaging step of imaging a plurality of reference standards to obtain a plurality of reference images, each reference standard having a reference part with a predetermined known dimension; a reference standard measuring step of measuring a measured dimension or a measured number of pixels of the reference part in the plurality of reference images; a regression line deriving step of obtaining a regression line by the least squares method from: the measured dimension or the measured number of pixels of the plurality of reference standards; and the known dimensions; and a determining step of determining whether a target part in a target image is within a predetermined range based on a correction value obtained by correcting a measured dimension of a target part by using a relational expression describing the regression line.

7 Claims, 4 Drawing Sheets

METHOD FOR MANUFACTURING SPARK PLUG

RELATED APPLICATIONS

This application claims the benefit of Japanese Patent Application No. 2018-131443, filed Jul. 11, 2018 and Japanese Patent Application No. 2019-045321, filed Mar. 13, 2019, the entire content of which are incorporated herein by reference.

FIELD OF INVENTION

The present invention relates to a method for manufacturing a spark plug, and more particularly, to a method for manufacturing a spark plug which includes a step of inspecting dimensions of various portions of the spark plug.

BACKGROUND OF THE INVENTION

A technique for manufacturing a spark plug is known involving inspecting, by image processing, dimensions of various portions which affect ignition performance, including the spark gap (Japanese Patent Application Laid-Open (kokai) No. 2002-313525).

In this technique, improvement of inspection accuracy is desired.

SUMMARY OF THE INVENTION

An advantage of the present invention is a method for manufacturing a spark plug which improves inspection accuracy.

In accordance with a first aspect of the present invention there is provided a method for manufacturing a spark plug, including: a plug imaging step of imaging a target part to obtain a target image, the target part being a measurement target of the spark plug; a plug measuring step of measuring a measured dimension of the target part in the target image or a measured number of pixels included in the target part in the target image; a reference standard imaging step of imaging a plurality of reference standards to obtain a plurality of reference images, each reference standard having a reference part with a predetermined known dimension different from each other and being imaged so as to include the corresponding reference part; a reference standard measuring step of measuring measured dimensions of the respective reference parts in the plurality of reference images or measured numbers of pixels included in the respective reference parts in the plurality of reference images; a regression line deriving step of obtaining a regression line by the least squares method from: the measured dimensions of the plurality of reference standards or the measured numbers of pixels included in the plurality of reference standards; and the known dimensions; and a determining step of determining whether the target part is within a predetermined range based on a correction value obtained by correcting the measured dimension of the target part or the measured number of pixels included in the target part, being obtained in the plug measuring step, by using a relational expression describing the regression line.

According to the method for manufacturing a spark plug of according to a first aspect, the measured dimension or the measured number of pixels in the target part measured in an image is corrected based on the correction value derived from the plurality of reference standards having different known dimensions. Therefore, compared to a case of using a correction equation derived from one reference standard, it is possible to improve the correction accuracy of the measured dimension or the measured number of pixels in the target part. As a result, the inspection accuracy is improved.

According to a second aspect of the present invention, there is provided a method for manufacturing a spark plug as described above wherein, in the plug measuring step, the correction value is displayed on a display device that displays the measurement result for the target part. Thus, in addition to the effect of the first aspect, the operator can confirm the good or bad based on the value displayed on the display device.

According to a third aspect of the present invention, there is provided a method for manufacturing a spark plug as described above wherein, the target part is a spark gap formed between two electrodes. Thus, in addition to the effects of the first or second aspect, it is possible to improve the accuracy of inspecting the spark gap between the two electrodes.

According to a fourth aspect of the present invention, there is provided a method for manufacturing a spark plug as described above wherein, the number of pixels included in the reference part in one of the plurality of reference images is counted before the reference standard measuring step, and a pixel dimension per pixel is calculated from the known dimension and the number of pixels. The reference standard measuring step and the plug measuring step are performed by using the pixel dimension. As a result, the correlation of a regression analysis can be enhanced so that the inspection accuracy can be further improved in addition to the effects of any one of the first to third aspects.

DETAILED DESCRIPTION OF THE INVENTION

Figure 1:
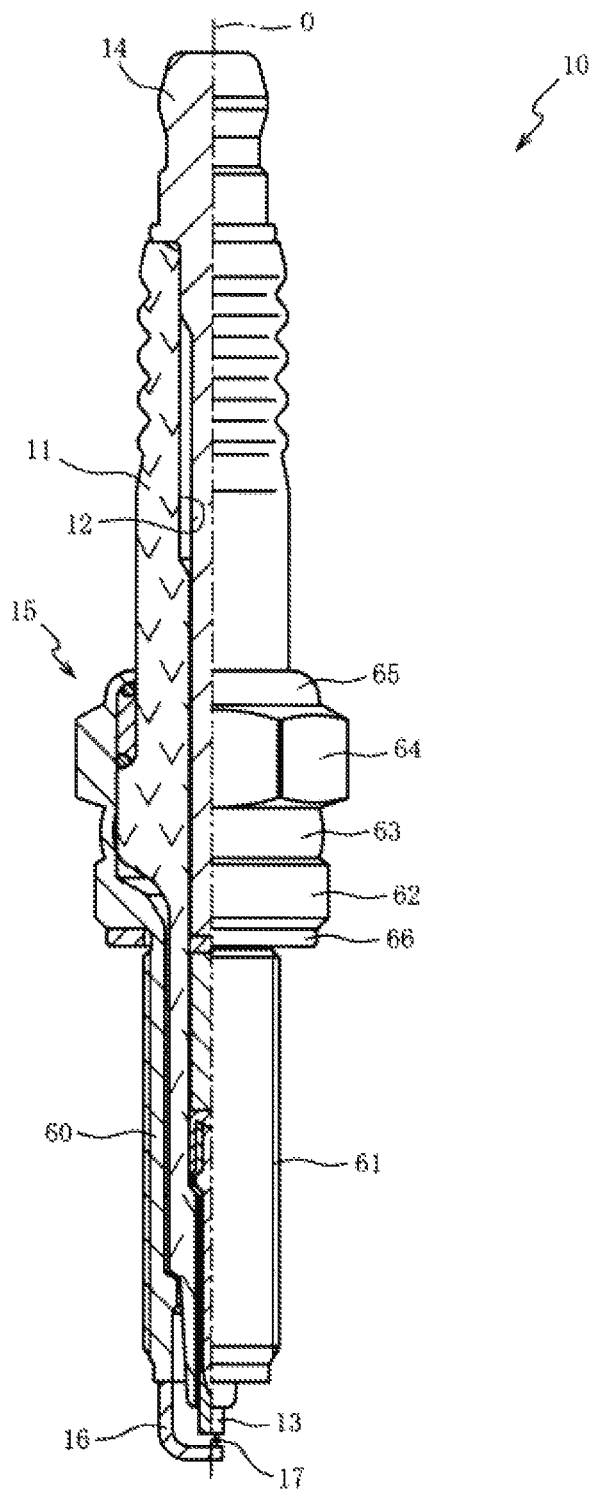
FIG. 1 is a cross-sectional view of one side of a spark plug in one embodiment.

Hereinafter, a preferred embodiment of the present invention will be described with reference to the accompanying drawings. FIG. 1 is a cross-sectional view of one side of a spark plug 10 in one embodiment. In FIG. 1, the lower side of the drawing sheet is referred to as the top end side of the spark plug 10, and the upper side of the drawing sheet is referred to as the rear end side of the spark plug 10. The spark plug 10 has a center electrode 13, held by an insulator 11, and a ground electrode 16, connected to a metal shell 15.

The insulator 11 is a cylindrical member made of alumina or the like having excellent mechanical and insulating properties at high temperatures, and has an axial hole 12 along an axial line O. The center electrode 13 is disposed at the top end side of the axial hole 12.

The center electrode 13 is a rod-shaped member extending along the axial line O, and is obtained by coating, with nickel or nickel base alloy, a core material made of copper or a core material containing copper as a main component. It is possible to omit the core. The center electrode 13 is held by the insulator 11, and a top end side of the center electrode 13 protrudes from the top end of the insulator 11.

A terminal metal fixture 14 is a rod-shaped member to which a high-voltage cable (not illustrated) is connected, and is made of a conductive metal material (e.g., low-carbon steel). With the top end side of the terminal metal fixture 14 inserted into the axial hole 12, the terminal metal fixture 14 is disposed at the rear end side of the insulator 11. The terminal metal fixture 14 is electrically connected to the center electrode 13 inside the axial hole 12.

The metal shell 15 is fixed to the top end side of the outer periphery of the insulator 11. The metal shell 15 is a substantially cylindrical member made of a conductive metal material (e.g., low-carbon steel). The ground electrode 16 is connected to the top end of the metal shell 15. The ground electrode 16 is a rod-shaped metallic (e.g., nickel-based alloy) member with a tip end side that is bent. The tip end side of the ground electrode 16 forms a spark gap 17 with the center electrode 13.

The metal shell 15 includes a body 60 having an external thread 61 on its outer peripheral surface, a seat 62 adjacent to the rear end side of the body 60, a connecting portion 63 adjacent to the rear end side of the seat 62, a tool engaging portion 64 adjacent to the rear end side of the connecting portion 63, and a crimping portion 65 adjacent to the rear end side of the tool engaging portion 64. The external thread 61 on the body 60 screws into a threaded hole of an internal combustion engine (not illustrated). The seat 62 is a portion for closing a gap between the threaded hole of the internal combustion engine (not illustrated) and the external thread 61.

The connecting portion 63 is a portion plastically deformed into a curved shape when the metal shell 15 is assembled to the insulator 11 using the crimping portion 65. The tool engaging portion 64 is a portion for engaging a tool such as a wrench when the external thread 61 is tightened into the threaded hole of the internal combustion engine. The crimping portion 65 is a portion which is plastically deformed when the metal shell 15 is assembled to the insulator 11 and is bent inward in the radial direction. A gasket 66 is disposed between the seat 62 and the external thread 61. With the spark plug 10 installed in the internal combustion engine, the gasket 66 is sandwiched between the seat 62 and the internal combustion engine to ensure an airtight seal.

The spark plug 10 is manufactured by the following method, for example. First, the center electrode 13 is inserted into the axial hole 12 of the insulator 11 and is arranged such that the top end of a center electrode 13 protrudes from the top end of the insulator 11. Next, while ensuring electrical conduction between the terminal metal fixture 14 and the center electrode 13, after the terminal metal fixture 14 is inserted into the axial hole 12, the metal shell 15 to which the ground electrode 16 is connected in advance is crimped and assembled to the outer periphery of the insulator 11. The ground electrode 16 is bent so that the spark gap 17 having a predetermined dimension is formed between the ground electrode 16 and the center electrode 13, thus obtaining the spark plug 10.

Figure 2:
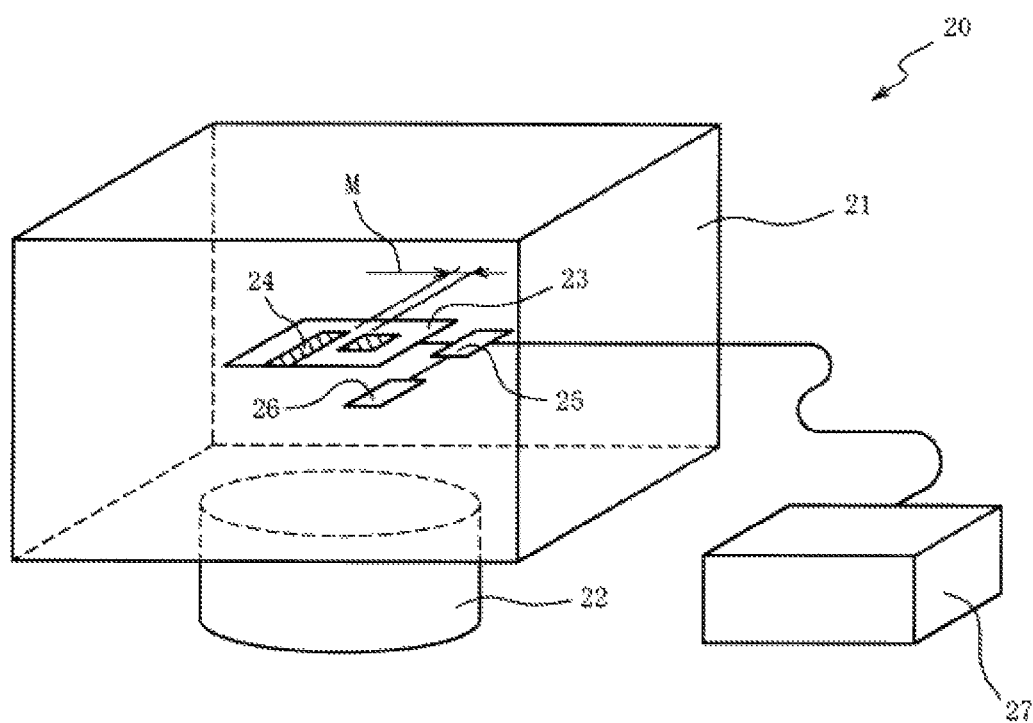
FIG. 2 is a schematic diagram of an inspection device.
Figure 2:
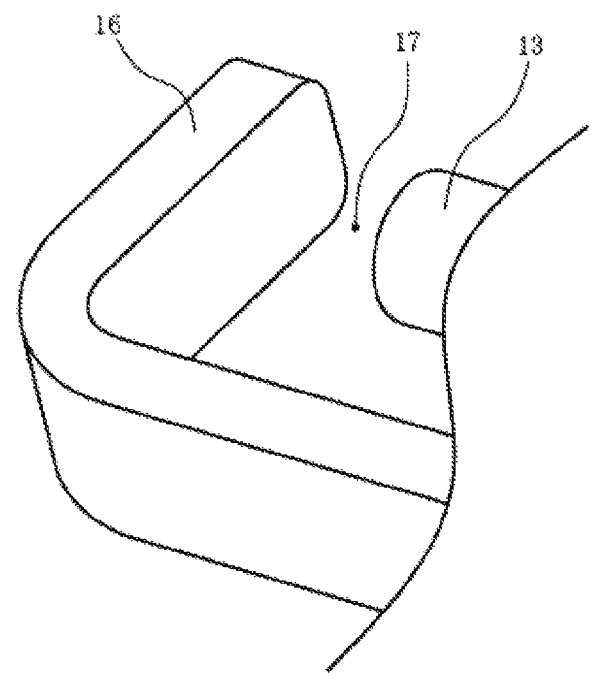

FIG. 2 is a schematic diagram of an inspection device 20. Inspecting dimensions of various portions of the spark plug 10, including the spark gap 17, is done with the inspection device 20. Hereinafter, the spark gap 17 will be used as an example of a target part for measurement of the spark plug 10.

The inspection device 20 is a device for inspecting whether the spark gap 17 (target part) is within a predetermined range by imaging the center electrode 13 and the ground electrode 16 including the spark gap 17 of the spark plug 10. The inspection device 20 includes a camera 21 with an imaging element 23 such as a CCD and a lens 22 for setting the size of the field of view imaged by the camera 21. In the imaging element 23, the field of view (range), set by the lens 22, of the center electrode 13 and the ground electrode 16 including the spark gap 17 is imaged as a target image 24.

The inspection device 20 includes: a calculation device 25 for performing computing processing based on the measured dimension M of the spark gap 17 in the target image 24 captured by the imaging element 23; an inputting device 26 for inputting the dimension of one pixel of the imaging element 23 (i.e., a pixel dimension which will be described later) and the like to the calculation device 25, and a display device 27 for displaying the measurement result for the spark gap 17 from the calculation device 25. The inspection device 20 images the center electrode 13 and the ground electrode 16, including the spark gap 17, with the imaging element 23 to obtain the target image 24 (plug imaging step). Further, the calculation device 25 measures the measured dimension M of the spark gap 17 in the target image 24 (plug measuring step). As will be described below, the inspection device 20 corrects the measured dimension M of the spark gap 17 (target part), thereby improving the inspection accuracy.

Figure 3A:
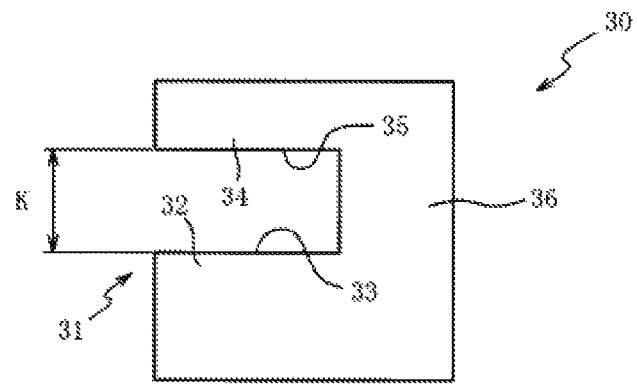
FIG. 3A is a front view of a reference standard.
Figure 3B:
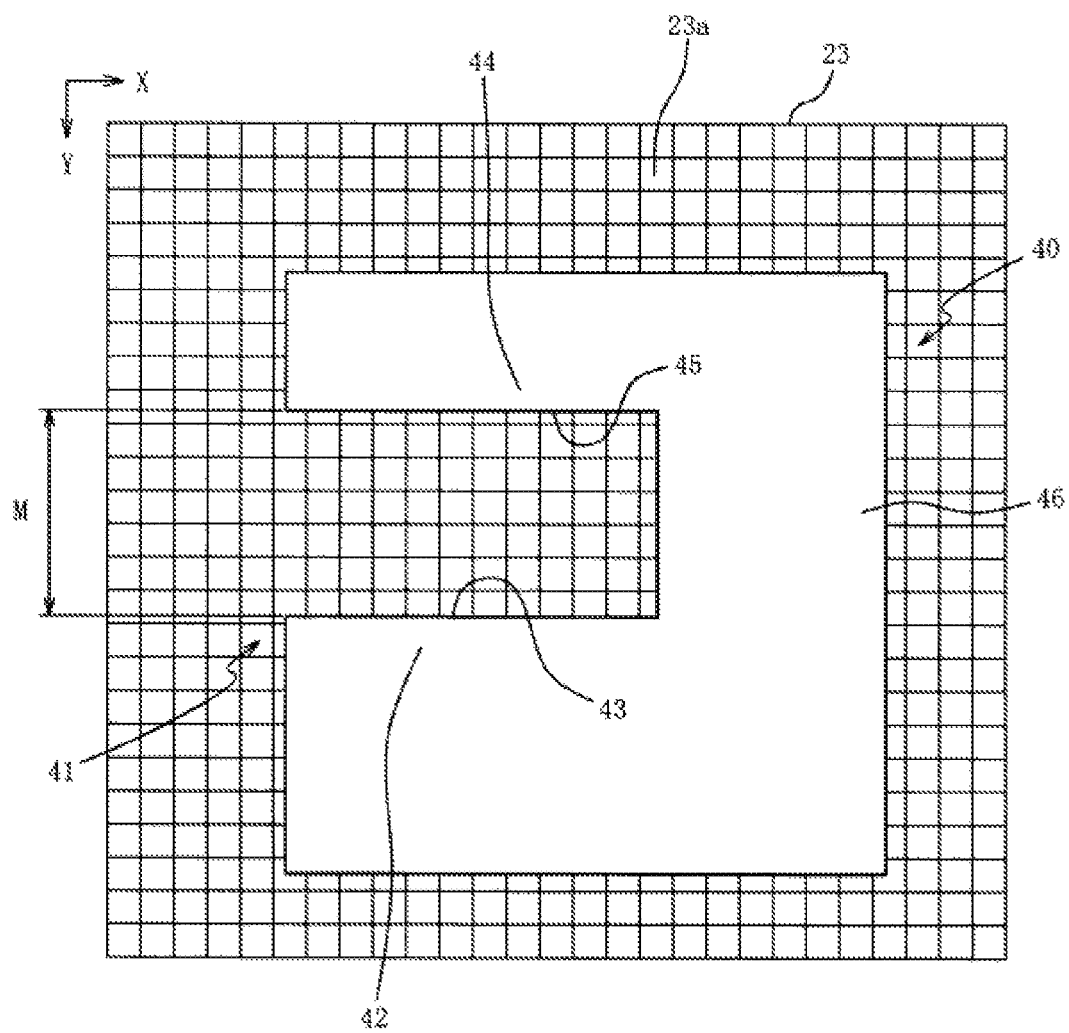
FIG. 3B is a schematic diagram of an imaging element which has imaged the reference standard.
Figure 4:
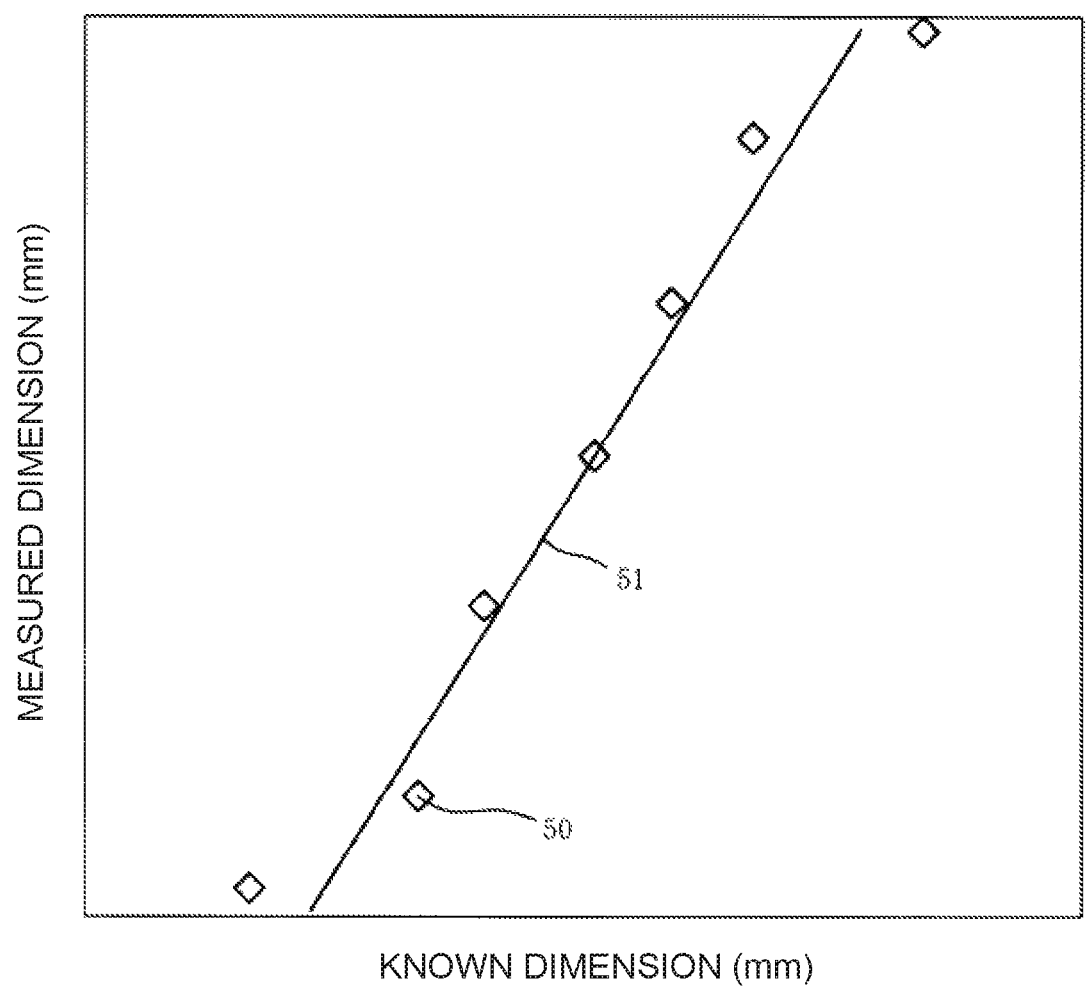
FIG. 4 is a correlation diagram showing a relationship between known dimensions and measured dimensions of reference standards.

Referring to FIGS. 3A, 3B and 4, a method for correcting the measured dimension M with the inspection device 20 using reference standards 30 will be described. FIG. 3A is the front view of a reference standard 30.

As shown in FIG. 3A, each reference standard 30 is a plate-like member made from a member that does not transmit light (e.g., made of metal or ceramic) and includes a reference part 31 having a predetermined known dimension K. Each reference standard 30 has a first portion 32, a second portion 34 disposed at a predetermined distance from the first portion 32, and a connecting portion 36 connecting the first portion 32 and the second portion 34. Edges 33, 35 of the first portion 32 and the second portion 34 are both straight, and the edges 33, 35 are parallel. The reference part 31 refers to a region between the edges 33, 35. The known dimension K of the reference part 31 is a distance between the edges 33, 35 (i.e., the length of the straight line perpendicular to the edges 33, 35). The known dimension K is a dimension inherent to the reference standard 30 that is measured using a calibrated "clearance gauge" or other measuring instrument. A plurality of reference standards 30 having different known dimensions K (e.g., known dimensions K which differ in 0.1 mm increment) are prepared.

FIG. 3B is a schematic diagram of the imaging element 23 which images a reference standard 30. In the drawing, the arrows X and Y represent directions in the plane of the imaging element 23. The imaging element 23 is a group of pixels 23a for converting brightness intensities into electric signals. The reference standards 30 are imaged by the imaging element 23 as reference images 40, each reference image 40 including a reference part 41. Each reference image 40 includes a first portion 42, a second portion 44 disposed at a predetermined distance in the Y direction from the first portion 42, and a connecting portion 46 connecting the first portion 42 and the second portion 44.

The imaging element 23 detects an edge 43 where the contrast of light and dark changes in the first portion 42, and an edge 45 where the contrast of light and dark changes in the second portion 44. The measured dimension L of the reference part 41 (bright portion) in the reference image 40 measured by the inspection device 20 is a distance between the edges 43, 45 (i.e., a length of a straight line extending in the Y direction perpendicular to the edges 43, 45). When the known dimension K is compared with the measured dimension L, a difference (error) may occur between the measured dimension L and the known dimension K due to the influence of the visual field of the inspection device 20, halation thereof, accuracy of the lens 22, calculation error, and the like.

In order to reduce this error, the inspection device 20 first images one of the plurality of reference standards 30 having different known dimensions K with the imaging element 23 to obtain one reference image 40. The known dimension K (mm) of the reference standard 30 is divided by the number of pixels 23a in the Y direction included in the reference part 41 of the reference image 40 to calculate a dimension per pixel (hereinafter referred to as "pixel dimension"). The calculated pixel dimension (mm) is imputed from an input device 26 (see FIG. 2) into the calculation device 25. In this way, the calculation device 25 calculates the measured dimension L by multiplying the calculated pixel dimension by the number of pixels of the reference part 41 detected by the imaging element 23. As a result, it is possible to minimize the calculation error of the calculation device 25.

Next, the inspection device 20 images the plurality of reference standards 30, having different known dimensions K, with the imaging element 23 so as to include the reference part 31, and obtains a plurality of reference images 40, each reference image 40 including the reference part 41 (reference standard imaging step). Next, the measured dimension L of the reference part 41 in each reference image 40 is measured (reference standard measuring step). Next, a regression analysis is performed based on the known dimensions K of the reference standards 30 and the measured dimensions L from the reference images 40.

FIG. 4 is a correlation diagram showing the relationship between the known dimensions K, in the reference part 31 of the plurality of reference standards 30, and the measured dimensions L, in the reference part 41 of the reference images 40. The operator of the inspection device 20 plots a plurality of points 50 indicating the measured dimensions L and the known dimensions K of the plurality of reference standards 30 on a graph whose vertical axis represents the measured dimensions L and whose horizontal axis represents the known dimension K. Then, a regression line 51 can be obtained by the least squares method from the relationship between the known dimensions K and the measured dimensions L (regression line deriving step).

The calculation device 25 uses a relational expression that describes the regression line 51 to correct the measured dimension M of the spark gap 17 in the target image 24 and obtains a correction value for the measured dimension M. Based on the correction value, the inspection device 20 determines whether the spark gap 17 of each manufactured spark plug 10 is within a predetermined range (determining step). In the determining step, the spark plug 10 whose spark gap 17 is determined to be within the predetermined range proceeds to the next step. For the spark plug 10 whose spark gap 17 is determined not to be within the predetermined range, the spark gap 17 is reset by adjusting the curvature of the ground electrode 16.

Since the inspection device 20 inspects the dimension of the spark gap 17 based on the correction value for the measured dimension M, the inspection accuracy can be improved compared to the case where the measured dimension M is not corrected. The correction value for the measured dimension M is obtained based on a regression analysis on the plurality of known dimensions K and the plurality of measured dimensions L. In this way, the correction accuracy can be improved for various measured dimensions M, having different values, in comparison to the case of using a correction equation derived by relying only on a single reference standard 30, for example. This contributes to the improvement of the inspection accuracy.

The inspection device 20 displays the correction value for the measured dimension M on the display device 27, not the measured dimension M of the spark gap 17 before the correction. Thus, the operator of the inspection device 20 can confirm the good or bad of the spark gap 17 from the value displayed on the display device 27.

The inspection device 20 calculates the dimension per pixel (i.e., the pixel dimension) based on one reference image 40. This is performed before measuring the measured dimensions L in the plurality of reference images 40 for the purpose of performing regression analysis based on the known dimensions K and the measured dimensions L. The calculated pixel dimension is imputed from the input device 26 into the calculation device 25, and the calculation device 25 multiplies the number of pixels of the reference part 41 by the pixel dimension to calculate a measured dimension L for performing the regression analysis. As a result, the correlation of the regression analysis can be improved, thereby further improving the correction accuracy. Thus, the inspection accuracy can be further improved. It should be noted that this operation can be omitted.

Each reference standard 30 includes the first portion 32 and the second portion 34 which are separated from each other by the gap (i.e., the reference part 31). Similarly, the spark plug 10, which is the measurement target, includes the center electrode 13 and the ground electrode 16 which are separated from each other by the spark gap 17. The reference part 31 of the reference standard 30 is detected as a bright portion in the reference image 40. Similarly, the spark gap 17 is detected as a bright portion in the target image 24. Since the construction of the reference part 31 of the reference standard 30 is similar to the construction of the center electrode 13 and the ground electrode 16 separated by the spark gap 17 to be measured, it is possible to minimize the occurrence of an error caused by the construction of the reference standard 30.

Although the present invention has been described above based on one embodiment, the present invention is not limited in any way to the above-mentioned embodiment, and it can be easily inferred that various improvements and modifications can be made within the scope not departing from the spirit of the present invention.

In the embodiment, a case where the calculation device 25 obtains the correction value of the measured dimension M based on the regression analysis of the known dimensions K and the measured dimensions L of the plurality of reference standards 30 was described, but the present invention is not necessarily limited to this. It is of course possible to obtain the number of pixels 23a in the Y direction included in the reference part 41 in the reference images 40 of the plurality of reference standards 30 (hereinafter referred to as the "measured number of pixels"), instead of the measured dimensions L in the reference part 31 of the reference standards 30, and obtain the correction value for the measured number of pixels based on a regression analysis of the measured number of pixels and the known dimensions K of the reference standards 30. The inspection device 20 compares the correction value for the measured number of pixels with a predetermined range of the measured number of pixels for the spark gap 17 and determines whether the spark gap 17 is within the predetermined range. Also in this case, the inspection accuracy can be improved similarly to the embodiment.

The correction value for the measured dimension M can be calculated by multiplying the correction value for the measured number of pixels, which is obtained based on the regression analysis of the measured number of pixels and the known dimensions K of the reference standards 30, by the dimension per pixel (i.e., the pixel dimension). In this case, the inspection device 20 compares the calculated correction value of the measured dimension M with a predetermined range for the spark gap 17, and determines whether the spark gap 17 is within the predetermined range. Also in this case, the inspection accuracy can be improved similarly to the embodiment.

In this case, the display device 27 may display the correction value of the measured dimension M, or may display the correction value for the measured number of pixels. In either case, the operator of the inspection device 20 can confirm the quality of the spark gap 17 with the correction value displayed on the display device 27.

Although the embodiment was described based on a case where a tip for suppressing quenching occurrence or the like is not disposed on the center electrode 13 and the ground electrode 16, the present invention is not necessarily limited to this. It is of course possible to arrange such a tip on at least one of the center electrode 13 and the ground electrode 16 of the spark plug 10. Also in this case, the inspection device 20 can perform a dimensional inspection of the spark gap 17 between the center electrode 13 and the ground electrode 16.

In the embodiment, a case of using reference standards 30 in which a gap is the reference part 31 was described, but the present invention is not necessarily limited to this. Naturally, it is possible to use reference standards having various shapes such as a rectangular plate shape, a needle shape, and a columnar shape. In this case, any region of the reference standard whose known dimension can be measured can be used as the reference part.

In the embodiment, a case where the ground electrode 16 connected to the metal shell 15 is bent was described, but the present invention is not necessarily limited to this. Instead of using a bent ground electrode 16, it is of course possible to use a straight ground electrode. In this case, the top end side of the metal shell 15 is extended in the axial direction, and a straight ground electrode is connected to the metal shell 15 so that the ground electrode faces the center electrode 13.

In the embodiment, the ground electrode 16 is disposed so that the tip end portion of the ground electrode 16 faces the center electrode 13 in the direction of the axial line. However, the present invention is not necessarily limited to this, and the positional relationship between the ground electrode 16 and the center electrode 13 can be set appropriately. Other positional relationships between the ground electrode 16 and the center electrode 13 include, for example, disposing the ground electrode such that the spark gap is formed between the side surface of the center electrode 13 and the top-end surface of the ground electrode 16.

In the embodiment, a spark gap 17 is used as an example of the target part to be subjected to dimensional inspection of the spark plug 10, but the present invention is not necessarily limited to this. It is of course possible to inspect the dimensions of other target parts of the spark plug 10 by image processing. The dimensions of other target parts include, for example, the outer diameter of the connecting portion 63 of the metal shell 15.

In the embodiment, a case of inspecting the dimensions of various portions of the spark plug 10 for igniting an air-fuel mixture by spark discharge was described, but the present invention is not necessarily limited to this. It is of course possible to inspect the dimensions of the various portions of a spark plug which ignite the air-fuel mixture by, for example, corona discharge, dielectric barrier discharge or pulsed arc discharge.

Although the spark plug 10 where the gasket 66 is disposed between the seat 62 and the external thread 61 is illustrated in the embodiment, the present invention is not necessarily limited thereto. It is of course possible to apply the present invention to a spark plug of a so-called tapered-sheet type in which the gasket 66 is omitted, the surface of the seat 62 facing the top end side is a tapered surface, and the tapered surface of the seat 62 is pressed against the internal combustion engine to ensure the airtight seal.

DESCRIPTION OF REFERENCE NUMERALS

10: Spark plug
13: Center electrode
16: Ground electrode
17: Spark gap (target part)
23a: Pixel
24: Target image
27: Display device
30: Reference standard
31: Reference part
40: Reference image
51: Regression line
K: Known dimension of reference part
L: Measured dimension of reference part:
M: Measured dimension of target part:

Having described the invention, the following is claimed:
1. A method for manufacturing a spark plug, comprising
a plug imaging step of imaging a target part to obtain a target image, the target part being a measurement target of the spark plug;
a plug measuring step of measuring a measured dimension of the target part in the target image or a measured number of pixels included in the target part in the target image;
a reference standard imaging step of imaging a plurality of reference standards to obtain a plurality of reference images, each reference standard having a reference part with a predetermined known dimension different from each other and being imaged so as to include the corresponding reference part;
a reference standard measuring step of measuring measured dimensions of the respective reference parts in the plurality of reference images or measured numbers of pixels included in the respective reference parts in the plurality of reference images;
a regression line deriving step of obtaining a regression line by the least squares method from: the measured dimensions of the plurality of reference standards or the measured numbers of pixels included in the plurality of reference standards; and the known dimensions; and
a determining step of determining whether the target part is within a predetermined range based on a correction value obtained by correcting the measured dimension of the target part or the measured number of pixels included in the target part, being obtained in the plug measuring step, by using a relational expression describing the regression line.

2. The method for manufacturing the spark plug according to claim 1, wherein, in the plug measuring step, the correction value is displayed on a display device that displays the measurement result for the target part.

3. The method for manufacturing the spark plug according to claim 1, wherein
the target part is a spark gap formed between two electrodes.

4. The method for manufacturing the spark plug according to claim 2, wherein
the target part is a spark gap formed between two electrodes.

5. The method for manufacturing the spark plug according to claim 1, wherein
a number of pixels included in the reference part in one of the plurality of reference images is counted before the reference standard measuring step,
a pixel dimension per pixel is calculated from the known dimension and the number of pixels, and
the reference standard measuring step and the plug measuring step are performed by using the pixel dimension.

6. The method for manufacturing the spark plug according to claim 2, wherein
a number of pixels included in the reference part in one of the plurality of reference images is counted before the reference standard measuring step,
a pixel dimension per pixel is calculated from the known dimension and the number of pixels, and
the reference standard measuring step and the plug measuring step are performed by using the pixel dimension.

7. The method for manufacturing the spark plug according to claim 3, wherein
a number of pixels included in the reference part in one of the plurality of reference images is counted before the reference standard measuring step,
a pixel dimension per pixel is calculated from the known dimension and the number of pixels, and
the reference standard measuring step and the plug measuring step are performed by using the pixel dimension.

* * * * *